UNITED STATES PATENT OFFICE.

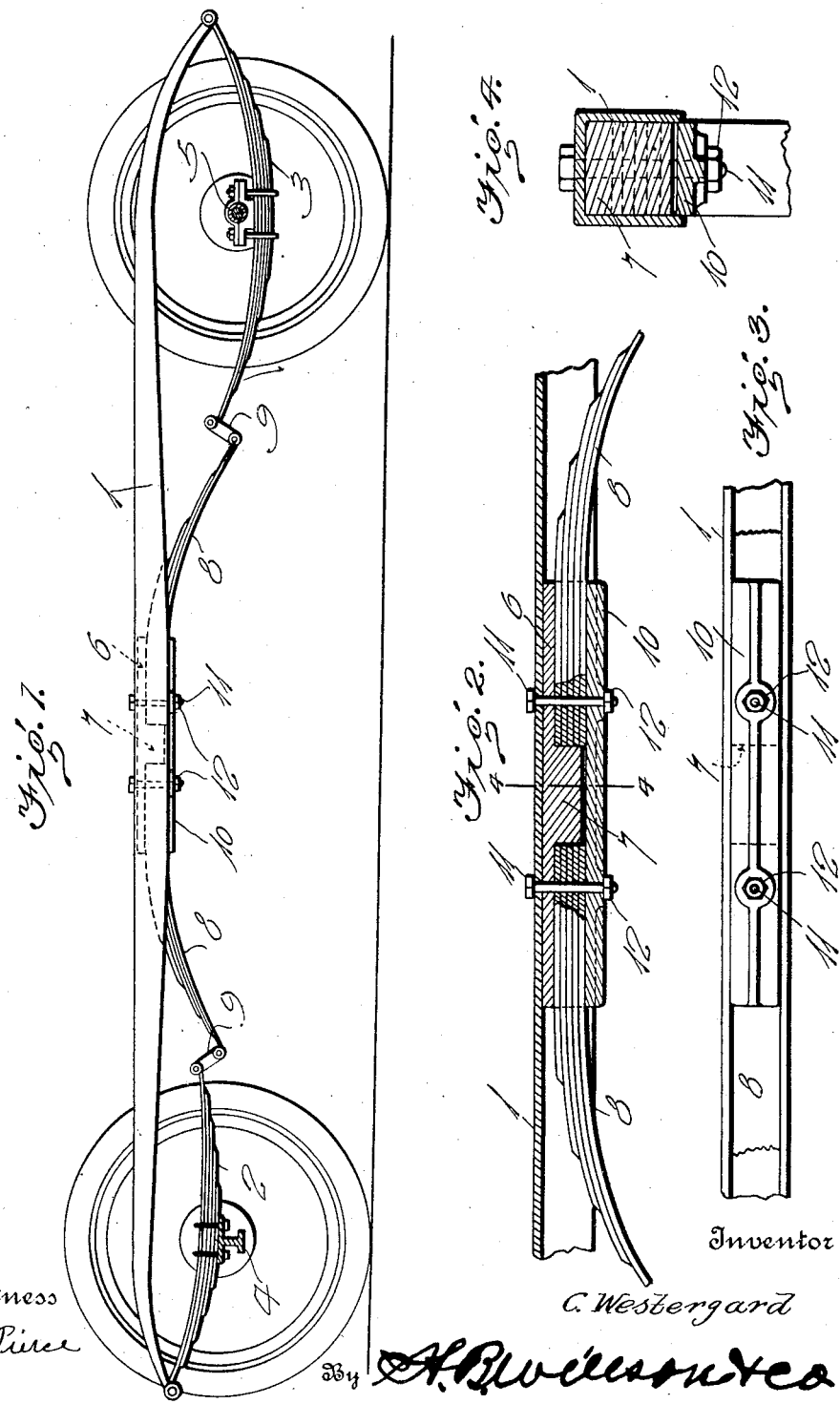

CHRIST WESTERGARD, OF DENBIGH, NORTH DAKOTA.

SPRING-MOUNTING FOR VEHICLE-BODIES.

1,354,082.　　　　Specification of Letters Patent.　　Patented Sept. 28, 1920.

Application filed November 13, 1919. Serial No. 337,798.

*To all whom it may concern:*

Be it known that I, CHRIST WESTERGARD, a citizen of the United States, residing at Denbigh, in the county of McHenry and State of North Dakota, have invented certain new and useful Improvements in Spring-Mountings for Vehicle-Bodies; and I do declare the following to be a full, clear, and exact description of the invention, such as will enable others skilled in the art to which it appertains to make and use the same.

My invention relates to improvements in spring mountings for vehicle bodies and it has for its principal object to provide a mounting which is of such construction that it will equally distribute relative movement of the vehicle body and the running gear throughout the length of both.

Another object of the invention is to provide a spring mounting and suspension for vehicles in which all the springs will become equally and uniformly depressed under heavy load strain, thus effecting easy riding and preventing easy breaking of the springs.

A further object of the invention is to provide a spring mounting for vehicles which is exceedingly simple in construction, effective in absorbing shocks, inexpensive to manufacture, yet highly efficient in use.

Other objects and advantages of the invention will become apparent during the course of the following description.

In the accompanying drawings forming a part of this specification and in which like numerals are employed to designate like parts throughout the same, Figure 1 is a side elevation of a portion of a vehicle equipped with my improved spring mounting.

Fig. 2 is an enlarged detail fragmental view of a portion of the structure shown in Fig. 1.

Fig. 3 is a bottom plan fragmentary view of Fig. 2.

Fig. 4 is a transverse section on the plane of the line 4—4 of Fig. 2.

In the drawings, wherein for the purpose of illustration is shown a preferred embodiment of my invention, the numeral 1 indicates the usual side bar or chassis bar of a vehicle, said bar being preferably channel-shaped in cross section and having its channeled side disposed downwardly. While I have shown only one of these bars, it is obvious that in use there will be two of them, and the spring mounting will be the same on both sides of the vehicle. As both sides are alike, only one side will be described, it therefore being understood that while the description of the parts is in the singular in some cases, it describes both sides and all like parts. The usual semi-elliptical vehicle supporting springs 2 and 3 are pivotally connected to the bar 1 and the spring 2 preferably rests on top of the front axle 4, while the rear spring 3 is suspended in any suitable manner from the rear axle 5, thus serving to relieve certain endwise strains to which vehicles are subjected.

Fitted snugly between side flanges of the chassis bar 1 is an anchoring plate 6 which may be made from either wood or metal. This plate is provided with a centrally disposed rectangular downwardly projecting portion 7 whose opposite ends form two spaced vertical shoulders against which the inner ends of the quarter-elliptical springs 8 bear. The outer end of each spring 8 is pivotally connected to the springs 2 and 3 as shown at 9. In order to clamp the inner ends of the springs 8 in position I employ a clamping plate 10 which contacts with the lower side of each quarter-elliptic spring at its inner end. This plate 10 is retained in clamping position by bolts 11 which extend through the chassis bar, inner ends of the springs 8, and then through the clamping plate. I desire to emphasize that this clamping plate is of a width to permit it to fit snugly between the side flanges of the chassis, so that it will act as a follower. With this construction it will be seen that when the nuts 12 on the bolts 11 are tightened the clamping plate will move inwardly into the channel bar 1 and clamp the springs 8 tightly between itself and the anchoring plate 6.

A spring mounting of the above construction will serve to equalize the strain on all of the springs, will relieve the body of the vehicle from lateral twists, and will equally distribute the relative movement of the body and the running gear throughout the length of both, thus causing extremely easy riding of the vehicle.

It is to be understood that the form of my invention herein shown and described is to be taken as a preferred form of the same and that various minor changes in the shape, size and arrangement of parts may be resorted to without departure from the spirit of the invention or the scope of the subjoined claims.

I claim:

1. A device of the character set forth comprising a channel-shaped chassis bar having its channeled side disposed downwardly, an anchoring plate fitted snugly between the side flanges of the chassis bar, said anchoring plate being provided with a centrally disposed rectangular downwardly projecting portion whose ends form spaced vertical shoulders, a pair of quarter-elliptic springs having pivotal connecting means at their outer ends and having their inner ends bearing against said shoulders and contacting the lower face of the anchoring plate, a clamping plate contacting with the lower sides of said quarter-elliptic springs at their inner ends, and fastening bolts passing through the chassis bar, inner ends of the quarter-elliptic springs and the clamping plate.

2. A structure as specified in claim 1, the clamping plate being fitted snugly between the side flanges of said chassis bar.

In testimony whereof I have hereunto set my hand.

CHRIST WESTERGARD.